United States Patent
Kim et al.

(10) Patent No.: US 12,251,922 B2
(45) Date of Patent: Mar. 18, 2025

(54) METHOD FOR MANUFACTURING ELECTRICAL STEEL SHEET PRODUCT

(71) Applicant: POSCO, Pohang-si (KR)

(72) Inventors: Jung-Woo Kim, Pohang-si (KR); Bongwoo Ha, Pohang-si (KR); Taeyoung No, Pohang-si (KR); Dong-Gyu Lee, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 693 days.

(21) Appl. No.: 17/280,577

(22) PCT Filed: Sep. 24, 2019

(86) PCT No.: PCT/KR2019/012408
§ 371 (c)(1),
(2) Date: Jun. 2, 2021

(87) PCT Pub. No.: WO2020/067703
PCT Pub. Date: Apr. 2, 2020

(65) Prior Publication Data
US 2022/0001646 A1    Jan. 6, 2022

(30) Foreign Application Priority Data
Sep. 28, 2018 (KR) .................. 10-2018-0116301

(51) Int. Cl.
*B32B 7/12* (2006.01)
*B32B 7/025* (2019.01)
(Continued)

(52) U.S. Cl.
CPC ............ *B32B 7/12* (2013.01); *B32B 7/025* (2019.01); *B32B 15/011* (2013.01); *B32B 37/08* (2013.01);
(Continued)

(58) Field of Classification Search
CPC ....... B32B 7/12; B32B 15/011; B32B 15/043; B32B 15/18; B32B 2037/1253;
(Continued)

(56) References Cited

U.S. PATENT DOCUMENTS

| 5,500,461 A | 3/1996 | Young |
| 5,500,462 A | 3/1996 | Young |
| 2016/0375658 A1* | 12/2016 | Kim ................ B32B 37/18 428/416 |

FOREIGN PATENT DOCUMENTS

| CN | 1829817 A | 9/2006 |
| CN | 104025207 A | 9/2014 |

(Continued)

OTHER PUBLICATIONS

Extended European Search Report dated Oct. 18, 2021 issued in European Patent Application No. 19867403.8.

(Continued)

*Primary Examiner* — Philip C Tucker
*Assistant Examiner* — Brian R Slawski
(74) *Attorney, Agent, or Firm* — Morgan, Lewis & Bockius LLP

(57) ABSTRACT

A method for manufacturing an electrical steel sheet product according to an exemplary embodiment of the present invention includes: preparing an adhesive coating composition; forming an adhesive coating layer by applying and then curing the adhesive coating composition onto a surface of an electrical steel sheet; forming a heat-fused layer by laminating and heat-fusing a plurality of electrical steel sheets on which the adhesive coating layers are formed; and cooling the heat-fused electrical steel sheets at a cooling rate of 0.05 to 20° C./min.

9 Claims, 3 Drawing Sheets

(51) Int. Cl.
  *B32B 15/01*   (2006.01)
  *B32B 37/08*   (2006.01)
  *B32B 37/10*   (2006.01)
  *B32B 37/12*   (2006.01)
  *C08K 3/22*    (2006.01)
  *C08K 3/32*    (2006.01)
  *C09J 163/00*  (2006.01)

(52) U.S. Cl.
  CPC .......... *B32B 37/10* (2013.01); *B32B 37/1207* (2013.01); *B32B 37/1284* (2013.01); *C08K 3/22* (2013.01); *C08K 3/32* (2013.01); *C09J 163/00* (2013.01); *B32B 2255/06* (2013.01); *B32B 2307/20* (2013.01); *C08K 2003/329* (2013.01)

(58) Field of Classification Search
  CPC ........ B32B 2037/1276; B32B 2255/06; B32B 2255/26; B32B 2307/20; B32B 2509/00; B32B 2605/08; B32B 37/08; B32B 37/10; B32B 37/12; B32B 37/1207; B32B 37/1284; B32B 38/0036; B32B 7/025; C08K 2003/329; C08K 3/29; C08K 3/32; B05D 2504/00; B05D 2601/22; B05D 5/10; C09D 163/00; C09J 163/00
  USPC .. 156/60, 307.1, 307.3, 307.5, 307.7, 308.2, 156/308.6, 309.6, 330, 331.4, 332, 334; 428/457, 458, 461, 463, 418
  See application file for complete search history.

(56) References Cited

FOREIGN PATENT DOCUMENTS

| | | |
|---|---|---|
| DE | 102013109801 A1 | 3/2015 |
| EP | 0923088 A | 6/1999 |
| EP | 2314408 A1 | 4/2011 |
| JP | 61-5920 A | 1/1986 |
| JP | 02-208034 A | 8/1990 |
| JP | H02-253943 A | 10/1990 |
| JP | 11-193475 A | 7/1999 |
| JP | 11-193476 A | 7/1999 |
| JP | 31008309 B | 11/2000 |
| JP | 2000-345360 A | 12/2000 |
| JP | 2001-323341 A | 11/2001 |
| JP | 2001338824 A * | 12/2001 |
| JP | 2002-019016 A | 1/2002 |
| JP | 2002-338949 A | 11/2002 |
| JP | 2003-100523 A | 4/2003 |
| JP | 2004-197179 A | 7/2004 |
| JP | 2005-129767 A | 5/2005 |
| JP | 2011-088192 A | 5/2011 |
| JP | 2011-194872 A | 10/2011 |
| JP | 2013-060630 A | 4/2013 |
| JP | 2013-245355 A | 12/2013 |
| JP | 2016-540901 A | 12/2016 |
| JP | 02-260910 B1 | 4/2017 |
| KR | 10-2010-0082537 A | 7/2010 |
| KR | 10-2011-0076374 A | 7/2011 |
| KR | 10-2015-0061472 A | 6/2015 |
| KR | 10-2015-0074817 A | 7/2015 |
| KR | 10-1728027 B1 | 4/2017 |
| KR | 10-2017-0076546 A | 7/2017 |
| KR | 10-1797129 B | 11/2017 |
| KR | 10-1867257 B | 6/2018 |
| KR | 10-2018-0074438 A | 7/2018 |
| WO | 2018/117750 A1 | 6/2018 |
| WO | 2018-117670 A | 9/2018 |

OTHER PUBLICATIONS

International Search Report and Written Opinion issued in International Application No. PCT/2019/012408 dated Jan. 13, 2020.
Notice of Allowance issued Sep. 15, 2023 for corresponding Chinese Patent Application No. 201980078846.8.

* cited by examiner

METHOD FOR MANUFACTURING ELECTRICAL STEEL SHEET PRODUCT

TECHNICAL FIELD

The present invention relates to a method for manufacturing an electrical steel sheet product. More particularly, the present invention relates to a method for manufacturing an electrical steel sheet product in which a plurality of electrical steel sheets are adhered to each other by an adhesive solution applied onto a surface of each of the electrical steel sheets. In addition, the present invention relates to a method for manufacturing an electrical steel sheet product in which an adhesive strength between electrical steel sheets is improved by heat fusion of an adhesive solution and a cooling condition of the product manufacturing method.

BACKGROUND ART

A non-oriented electrical steel sheet is a steel sheet of which magnetic properties are uniform in all directions on a rolling plate. The non-oriented electrical steel sheet is widely used in a motor, an iron core of a generator, an electric motor, a small-sized transformer, and the like. The non-oriented electrical steel sheet is divided into two types: a non-oriented electrical steel sheet required to be subjected to stress relief annealing (SRA) to improve magnetic properties after punching; and a non-oriented electrical steel sheet required to be subjected to no SRA when a cost loss due to heat treatment is larger than the effect of the magnetic properties by SRA. These two types of non-oriented electrical steel sheets are individually used in markets for a drive motor, a home appliance, or a large-sized motor.

Meanwhile, formation of an insulation coating film is a procedure corresponding to a finishing process for manufacturing a product. It is required for the insulation coating film to have various physical properties. In general, electrical properties for suppressing an eddy current are required. In addition, when a steel sheet is subjected to punching into a predetermined shape, and then, a plurality of steel sheets are laminated to form an iron core, continuous punchability for suppressing abrasion of a mold is required. In addition, after a stress relief annealing (SRA) procedure for recovering the magnetic properties by removing processing stress of the steel sheet, adhesion resistance that prevents the steel sheets of the iron core from being closely adhered to each other and surface adhesion are required. In addition to such basic characteristics, excellent application workability of a coating solution, solution stability that allows long-term use of the solution after being mixed, and the like are also required in terms of manufacturing companies.

As described above, a major purpose of a non-oriented insulation coating film is to insulate layers between iron sheets to be laminated. However, in accordance with an increase in use of a small-sized electric motor, a coating performance advantageous for workability, weldability, and corrosion resistance, as well as an insulating property, is evaluated as a major physical property. In addition, recently, an insulation coating film having functionality such as an adhesive coating solution that affects processing of a motor core and efficiency of a motor by surface properties has been spotlighted.

An insulation coating composition for a non-oriented electrical steel sheet is largely divided into three types: organic, inorganic, and organic-inorganic composite coating compositions, and a method of applying an inorganic coating solution (phosphate or chromate) first and then coating an organic coating solution has been also studied until now. The inorganic coating solution contains an inorganic substance such as phosphate as a main component and may form a coating film excellent in heat resistance, weldability, lamination properties. Therefore, the inorganic coating solution has been used for an EI core. However, an insulation coating film obtained using an inorganic coating solution has a high hardness, which causes that damage to a mold at the time of punching occurs faster than that in a case of organic substance-containing coating. Therefore, the inorganic coating solution is an insulation coating solution disadvantageous for punchability. The organic coating solution is significantly excellent in punchability because the organic coating solution is composed of an organic substance as a main component. In addition, the organic coating solution is widely used in a large-sized iron core requiring a high insulating property between layers because it may implement preferred adhesion even in a case where a thickness of a film is increased. However, an organic coating film does not exhibit preferred properties in terms of weldability due to gas generated by decomposition of a resin during welding, and also has poor adhesion on a surface after stress relief annealing (SRA). For this reason, the development of an organic/inorganic composite coating solution obtained by using both an organic substance and an inorganic substance to complement defects of punchability caused when using an inorganic substance such as phosphate or chromate has been actively conducted in consideration of importance of heat resistance, an insulating property, and the like.

As described above, recently, the quality of a high-end non-oriented electrical steel sheet for a drive motor for an environmentally friendly vehicle has been improved in accordance with the low-carbon policy of the government. The higher the quality is, the higher the functionality of the surface of the non-oriented electrical steel sheet is required. In particular, in order to minimize an eddy current loss that may be caused by a fastening process of a motor core, a non-oriented electrical steel sheet product that may be fastened by a surface coating layer has been developed.

Stoving enamel (enamel or coating composition required to be baked at room temperature), which is a type of adhesive coating, has been applied to an electric machine (a transformer, a generator, or a motor) in which single electrical steel sheets are bonded to each other by hot pressing after coating and also has been used to impart a surface insulating property. However, the stoving enamel is limited in use due to a relatively low resoftening temperature. In order to further broaden an application range in the field of the electric machine, it is required to apply a high resoftening temperature to an adhesive solution. To this end, a new development of stoving enamel having excellent heat resistance is urgently required. In addition, improvements in surface properties such as a higher insulating property, durability against mechanical stress, and bonding strength are also required.

As a technology according to the related art, there is a stable aqueous epoxy resin dispersion containing dicyandiamide ($C_2H_4N_4$) and having surface activity. The dispersion is suitable for coating many different types of materials. However, the aqueous epoxy resin dispersion is generally not useful for an iron core requiring a high level of properties as required for use in an electric motor and a transformer, for example, high corrosion resistance and a high resoftening temperature.

As another technology according to the related art, there is a method for manufacturing a motor core laminate by coating an aqueous epoxy resin on a surface of an electrical steel sheet, the aqueous epoxy resin containing not only a resol-type (thermosetting plastic having desired physical properties by being cross-linked without a curing agent) specific phenolic resin as a cross-linking agent but also dicyandiimide. Cross-linking is performed by polycondensation of an epoxy resin and a phenolic resin.

As still another technology according to the related art, there is enamel for coating an electrical steel sheet containing particles, for example, silica or alumina colloidal particles. The composition forms coating having properties such as preferred scratch resistance, block resistance, chemical resistance, corrosion resistance, and a high surface insulating property. However, such coating has no bonding action, and an additional bonding means (welding, clamping, interlocking, aluminum die casting, or riveting) is required to form an iron core.

As still another technology according to the related art, there is a method for manufacturing an adhesive laminated iron core by applying a composition having a glass transition temperature (Tg) of higher than 60° C. and containing thermoplastic acrylic emulsion, epoxy emulsion, and the like as main components, drying the composition to obtain steel sheets, laminating the obtained steel sheets, and heating and pressing the laminated steel sheets in a molding machine during punching. The method has advantages in that a process of applying an adhesive onto a surface of an electrical steel sheet and a heat-fusing process in a coating process may be omitted, and blocking, which may occur when winding steel sheets into a coil, does not occur. However, an actual laminated iron core obtained by heating and pressing the electrical steel sheet manufactured by the above method may have a portion at which adhesion is incomplete and may have peeling-off occurring between layers due to adhesive failure in a certain case. In particular, in a case where an iron core is large, adhesive failure as described below may occur more seriously.

As still another technology according to the related art, there is a method in which one or a mixture of two or more resins such as an acrylic resin, an epoxy-based resin, a phenolic resin, and a silicone-based resin as an adhesive resin is used, and additives such as an amine-based curing agent and silica are added, thereby implementing a preferred adhesive strength when a glass transition temperature or a softening temperature is 60° C. or higher and preventing a sticking phenomenon between sheets when the sheets are wound in a coil state. However, the above technology has disadvantages in that a high-temperature adhesive strength and high-temperature oil resistance required for a drive motor for a vehicle deteriorate.

DISCLOSURE

Technical Problem

The present invention has been made in an effort to provide a method for manufacturing an electrical steel sheet product. More particularly, the present invention has been made in an effort to provide a method for manufacturing an electrical steel sheet product in which a plurality of electrical steel sheets are adhered to each other by heat fusion of an adhesive solution applied onto a surface of each of the electrical steel sheets. In addition, the present invention has been made in an effort to provide a method for manufacturing an electrical steel sheet product in which an adhesive strength between electrical steel sheets is improved by heat fusion of an adhesive solution and a cooling condition of the product manufacturing method.

Technical Solution

An exemplary embodiment of the present invention provides a method for manufacturing an electrical steel sheet product, the method including: preparing an adhesive coating composition; forming an adhesive coating layer by applying and then curing the adhesive coating composition onto a surface of an electrical steel sheet; forming a heat-fused layer by laminating and heat-fusing a plurality of electrical steel sheets on which the adhesive coating layers are formed; and cooling the heat-fused electrical steel sheets at a cooling rate of 0.05 to 20° C./min.

In the cooling of the heat-fused electrical steel sheets, a holding pressing force may be 1,000 $N/mm^2$ or less.

In the cooling of the heat-fused electrical steel sheets, the holding pressing force may be 500 $N/mm^2$ or less and the cooling rate may be 0.05 to 1° C./min.

In the cooling of the heat-fused electrical steel sheets, a cooling finish temperature may be 10 to 100° C.

The adhesive coating composition may contain an organic/inorganic complex containing an organic resin and an inorganic nanoparticle substituted for the organic resin; and an inorganic substance.

The organic resin may include one or more selected from an epoxy-based resin, an ester-based resin, an acrylic resin, a styrene-based resin, a urethane-based resin, and an ethylene-based resin.

Specifically, the organic resin may be a water-soluble epoxy resin, and more specifically, the water-soluble epoxy resin may be a multifunctional epoxy resin having three or more epoxy groups, and the water-soluble epoxy resin may have a weight average molecular weight of 1,000 to 50,000, a softening temperature (Tg) of 70 to 120° C., and a solid fraction of 10 to 50 wt %.

The inorganic nanoparticle may include one or more of $SiO_2$, $TiO_2$, ZnO, $Al_2O_3$, MgO, CaO, and $ZrO_2$.

The inorganic nanoparticle may be substituted in the organic/inorganic complex in an amount of 1 to 60 parts by weight with respect to 100 parts by weight of the organic resin.

The inorganic substance may be phosphoric acid ($H_3PO_4$) or sodium hydroxide (NaOH).

The inorganic substance may be contained in an amount of 1 to 70 parts by weight with respect to 100 parts by weight of a solid content of the organic/inorganic complex.

The forming of the adhesive coating layer may be performed in a temperature range of 200 to 600° C.

In the forming of the adhesive coating layer, a ratio of the inorganic substance to an organic substance in the coating layer may be 0.05 to 0.6.

In the forming of the heat-fused layer, a pressing force may be 1 to 2,000 $N/mm^2$, a pressing time may be 1 to 180 minutes, and a pressing temperature may be 100 to 300° C.

Advantageous Effects

The method for manufacturing an electrical steel sheet product according to an exemplary embodiment of the present invention may implement fastening of the electrical steel sheets by heat fusion of the adhesive solution applied onto the surface of the electrical steel sheet without using an existing fastening method (welding, clamping, interlocking, or the like) to maximize efficiency of a drive motor for an environmentally friendly vehicle (hybrid electric vehicle (HEV) or electric vehicle (EV)). By omitting the existing fastening method, the efficiency of the drive motor for a vehicle may be significantly improved, and vibration and noise problems of the existing motor may also be significantly reduced.

The method for manufacturing an electrical steel sheet product according to an exemplary embodiment of the present invention may implement an excellent room temperature adhesive strength, high-temperature adhesive strength, and high-temperature oil resistance of the adhesive solution composition by the cooling condition after heat fusion.

In the product manufactured by the method for manufacturing an electrical steel sheet product according to an exemplary embodiment of the present invention, an adhesive strength is significantly excellent, and oil does not permeate between interfaces of single cores (weak boundary surfaces) or the adhesive coating layer is not melted by oil.

The product manufactured by the method for manufacturing an electrical steel sheet product according to an exemplary embodiment of the present invention has not only excellent surface properties and processing properties (corrosion resistance, adhesion, weather resistance, fastening force, weldability, heat resistance, scratch resistance, and the like) but also an excellent high-temperature adhesive strength and high-temperature oil resistance by the heat-fusing process after punching.

MODE FOR INVENTION

Figure 1:
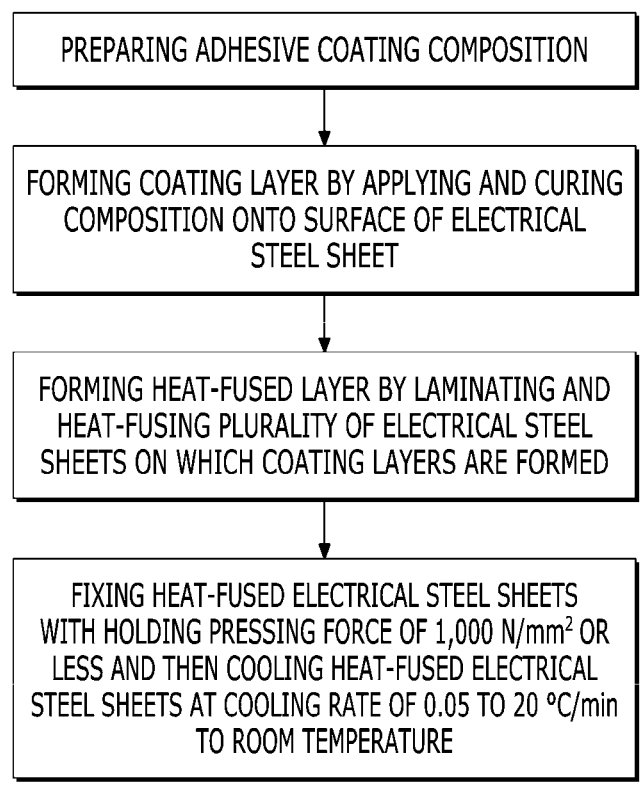
FIG. 1 is a flow chart of a method for manufacturing an electrical steel sheet product according to an exemplary embodiment of the present invention.

In the present specification, the terms "first", "second", "third", and the like are used to describe various parts, components, regions, layers, and/or sections, but are not limited thereto. These terms are only used to differentiate a specific part, component, region, layer, or section from another part, component, region, layer, or section. Accordingly, a first part, component, region, layer, or section which will be described hereinafter may be referred to as a second part, component, region, layer, or section without departing from the scope of the present invention.

In the present specification, unless explicitly described to the contrary, "comprising" any components will be understood to imply the inclusion of other components rather than the exclusion of any other components.

In the present specification, technical terms used are to mention only a specific exemplary embodiment, and are not intended to limit the present invention. Singular forms used herein include plural forms as long as phrases do not clearly indicate an opposite meaning. The term "comprising" used in the present specification concretely indicates specific properties, regions, integers, steps, operations, elements, and/or components, and is not to exclude the presence or addition of other specific properties, regions, integers, steps, operations, elements, and/or components.

In the present specification, the term "combination thereof" included in Markush type expression means a mixture or combination of one or more selected from the group consisting of components described in Markush type expression, and means comprising one or more selected from the group consisting of the above-described components.

In the present specification, when any part is positioned "on" or "above" another part, it means that the part may be directly on or above the other part or another part may be interposed therebetween. In contrast, when any part is positioned "directly on" another part, it means that there is no part interposed therebetween.

Unless defined otherwise, all terms including technical terms and scientific terms used herein have the same meanings as understood by those skilled in the art to which the present invention pertains. Terms defined in a generally used dictionary are additionally interpreted as having the meaning matched to the related technical document and the currently disclosed contents and are not interpreted as ideal or very formal meanings unless otherwise defined.

In addition, unless otherwise stated, % means wt %, and 1 ppm is 0.0001 wt %.

In an exemplary embodiment of the present invention, a method for manufacturing an electrical steel sheet product is provided.

The method for manufacturing an electrical steel sheet product according to an exemplary embodiment of the present invention includes preparing an adhesive coating composition; forming an adhesive coating layer by applying and then curing the adhesive coating composition onto a surface of an electrical steel sheet; forming a heat-fused layer by laminating and heat-fusing a plurality of electrical steel sheets on which the adhesive coating layers are formed; and cooling the heat-fused electrical steel sheets at a cooling rate of 0.05 to 20° C./min. In an exemplary embodiment of the present invention, the electrical steel sheet is a non-oriented or oriented electrical steel sheet, and more specifically, may be a non-oriented electrical steel sheet.

The adhesive coating composition may contain an organic/inorganic complex containing an organic resin and an inorganic nanoparticle substituted for the organic resin; and an inorganic substance.

First, the organic resin will be described.

Specifically, the organic resin may be a thermoplastic adhesive resin. More specifically, the organic resin may include one or more selected from an epoxy-based resin, an ester-based resin, an acrylic resin, a styrene-based resin, a urethane-based resin, and an ethylene-based resin. Still more specifically, the organic resin may be a water-soluble epoxy resin. A molecular weight of the water-soluble epoxy resin may be adjusted while changing a ratio of biphenyl A (BPA) and epichlorohydrin (ECH). More specifically, the water-soluble epoxy resin may be a multifunctional epoxy resin having three or more epoxy groups. This is to improve heat resistant adhesiveness. The water-soluble resin may have a molecular weight of 1,000 to 50,000 g/mol, a softening temperature (Tg) of 70 to 120° C., and a solid fraction of 10 to 50 wt %. When a molecular weight of epoxy is too small, curability may deteriorate and physical properties of a coating film, such as strength, may deteriorate. On the contrary, when the molecular weight of epoxy is too large, phase separation may occur in an aqueous dispersion resin and compatibility with the inorganic nanoparticles may deteriorate. Specifically, the molecular weight of the epoxy resin may be 5,000 to 40,000 g/mol, and more specifically, the molecular weight of the epoxy resin may be 5,000 to 30,000 g/mol. In addition, the epoxy resin consists of a combination of bisphenol and epoxide; however, a part of a structural formula may be substituted with a polar group in order to be present in an aqueous dispersion state, and the epoxy resin may have a stable state without the phase separation such as deposition or precipitation in the aqueous dispersion state.

Next, the inorganic nanoparticle will be described. The inorganic nanoparticle may include one or more of $SiO_2$, $TiO_2$, ZnO, $Al_2O_3$, MgO, CaO, and $ZrO_2$. Specifically, the inorganic particle may be $SiO_2$, $TiO_2$, or ZnO. In order to secure a high-temperature adhesive strength and high-temperature oil resistance, a nanoparticle in a colloidal state may be substituted for the above-described thermoplastic resin to modify the thermoplastic resin into an organic/inorganic complex form. In a case where the inorganic particle is $SiO_2$, an average particle size of the inorganic particles may be 3 to 50 nm. In addition, the amount of $SiO_2$ may be 1 to 40 parts by weight, and specifically, 3 to 40 parts by weight, with respect to 100 parts by weight of the organic resin. In a case where the inorganic particle is $TiO_2$, an average particle size of the inorganic particles may be 20 to 100 nm. In addition, the amount of $TiO_2$ may be 5 to 30 parts by weight with respect to 100 parts by weight of the organic resin. In a case where the inorganic nanoparticle is ZnO, an average particle size of the inorganic nanoparticles may be 3 to 100 nm, and specifically, 10 to 60 nm. In addition, the amount of ZnO may be 3 to 60 parts by weight with respect to 100 parts by weight of the organic resin. When an average particle size of inorganic nanoparticles in a colloidal state is too small, not only does it take a long time for the thermoplastic resin to be modified into a complex but it is not cost-effective because a substituted complex is expensive. On the contrary, when the average particle size of the inorganic nanoparticles is too large, compatibility with an adhesive resin deteriorates, and a weak boundary layer (WBL) is also generated due to a large particle size at an interface of an applied sample, resulting in deterioration of the adhesive strength due to introduction of oil or moisture through the weak boundary layer. In addition, when the amount of inorganic nanoparticles is too small, a ratio of the nanoparticles to a ratio of the adhesive resin in the coating layer is too low, and thus, heat resistance deteriorates. As a result, the high-temperature adhesive strength and oil resistance deteriorate. On the contrary, when the amount of inorganic nanoparticles is too large, heat resistance of the complex is improved, but a ratio of the organic resin in the coating layer is low, and thus, the high-temperature adhesive strength and oil resistance tend to deteriorate.

Next, the inorganic substance will be described. The inorganic substance may be phosphoric acid ($H_3PO_4$) or sodium hydroxide (NaOH). In order to maximize the high-temperature adhesive strength and high-temperature oil resistance of the above-described organic/inorganic complex, an inorganic substance having excellent solubility may be dissolved in the organic/inorganic complex. The amount of inorganic substance dissolved may be 1 to 70 parts by weight with respect to 100 parts by weight of a solid content of the organic/inorganic complex. In particular, in a case where the inorganic substance is phosphoric acid, the amount of inorganic substance dissolved may be 1 to 70 parts by weight, and specifically, 1 to 50 parts by weight. In addition, in a case where the inorganic substance is sodium hydroxide, the amount of inorganic substance dissolved may be 1 to 15 parts by weight, and specifically, 1 to 10 parts by weight. When the amount of inorganic substance dissolved is too small, a ratio of the inorganic substance in the complex is too low, and thus, the high-temperature adhesive strength and high-temperature oil resistance cannot be improved. On the contrary, when the amount of inorganic substance dissolved is too large, a deposition phenomenon occurs according to excessive dissolution of the inorganic substance in the complex, which improves heat resistance, but the high-temperature adhesive strength and oil resistance tend to deteriorate due to a relatively low ratio of the adhesive resin.

Next, the forming of the adhesive coating layer by applying and then curing the adhesive coating composition onto the surface of the electrical steel sheet will be described. The organic/inorganic complex adhesive solution in which the inorganic nanoparticles are substituted and the inorganic substance is dissolved as described above may be subjected to heat treatment in a temperature range of 200 to 600° C. for 5 to 40 seconds to be applied at a thickness of 0.5 to 10.0 μm per one surface. In such a case, the electrical steel sheet may have excellent surface properties (for example, an insulating property, corrosion resistance, and adhesion). In this case, the inorganic nanoparticles and the inorganic substance may be uniformly distributed.

Next, the forming of the heat-fused layer by laminating and heat-fusing the plurality of electrical steel sheets on which the adhesive coating layers are formed will be described. The coated sample may be heat-fused at a pressing force of 1 to 1,000 $N/mm^2$ and a temperature of 120 to 300° C. for 5 to 180 minutes.

Next, the cooling of the heat-fused electrical steel sheets at the cooling rate of 0.05 to 20° C./min will be described. In this case, a holding pressing force may be 1,000 $N/mm^2$ or less, and specifically, 500 $N/mm^2$ or less. In addition, the cooling rate may be 0.05 to 1° C./min. Meanwhile, the cooling finish temperature may be 10 to 1,000° C., and specifically, room temperature. Such a bonding core cooling method is performed to further improve a fastening force of the adhesive composition. As a result of evaluating an adhesive strength (tensile strength, peeling-off) at room temperature, an adhesive strength at a high temperature (for example, 150° C.), and oil resistance at a high temperature (for example, 170° C.) of the sample manufactured by cooling the electrical steel sheet after heat fusion to room temperature, an electrical steel sheet product of which adhesive strength is significantly excellent and in which automatic transmission fluid (ATF) oil does not permeate into interfaces between single cores or the adhesive coating layer is not melted by oil is obtained.

Hereinafter, examples of the present invention will be described in detail so that those skilled in the art to which the present invention pertains may easily practice the present invention. However, the present invention may be implemented in various different forms and is not limited to examples described herein.

EXAMPLES

In order to maximize a high-temperature adhesive strength and high-temperature oil resistance of each of three types of organic/inorganic complexes (epoxy-SiO$_2$-based, epoxy-TiO$_2$-based, and epoxy-ZnO-based organic/inorganic complexes) shown in Table 1, a predetermined amount of sodium hydroxide (NaOH) or phosphoric acid (H$_3$PO$_4$) was dissolved in each of the organic/inorganic complexes. The amounts of sodium hydroxide (NaOH) or phosphoric acid (H$_3$PO$_4$) dissolved were 1 to 10 parts by weight and 1 to 70 parts by weight, respectively, with respect to 100 parts by weight of a solid content of the organic/inorganic complex. A molecular weight of the used epoxy adhesive resin was about 30,000, average particle sizes of SiO$_2$, TiO$_2$, and ZnO substituted for the epoxy adhesive resin were 25 nm, 20 nm, and 10 nm, respectively, and amounts of particles were 20 parts by weight, 15 parts by weight, and 30 parts by weight, respectively, with respect to 100 parts by weight of the epoxy resin. Basic surface properties (an insulating property, corrosion resistance, adhesion, and the like) of a non-oriented electrical steel sheet after coating were significantly excellent, and processability (slitting property and punchability) was also excellent.

As can be seen from Table 1, the solution stability tends to deteriorate as the amount of sodium hydroxide (NaOH) or phosphoric acid (H$_3$PO$_4$) dissolved increases. The room temperature adhesive strength is generally excellent regardless of the type and size of the substituted inorganic particles, but tends to deteriorate as the amount of sodium hydroxide (NaOH) or phosphoric acid (H$_3$PO$_4$) dissolved increases. This is because the amount of adhesive resin in the coating layer is relatively smaller than those of the nanoparticles and the inorganic substance. The high-temperature adhesive strength and the high-temperature oil resistance were similar in all the adhesive solutions, and in the case of the epoxy-SiO$_2$-based complex adhesive solution, when the amount of sodium hydroxide (NaOH) or phosphoric acid (H$_3$PO$_4$) dissolved was 1 to 15 wt %, all the two properties were excellent. In addition, in the cases of the epoxy-TiO$_2$-based complex adhesive solution and the epoxy-ZnO-based complex adhesive solution, when the amount of sodium hydroxide (NaOH) or phosphoric acid (H$_3$PO$_4$) dissolved was at an appropriate level, all the two properties were also excellent. It can be appreciated that this is related to not only dissolved sodium hydroxide (NaOH) or phosphoric acid (H$_3$PO$_4$) but also the size and amount of the substituted nanoparticles. In general, when the amount of the entire substituted and dissolved inorganic substances (the nanoparticles and the inorganic substance) is too small, a ratio of the adhesive resin contained in the adhesive solution is relatively low, resulting in deterioration of the high-temperature adhesive strength and the high-temperature oil resistance. On the contrary, when the amount of the inorganic substances (the nanoparticles and the inorganic substance) is too large, the heat resistance is improved by the inorganic substance, but the ratio of the adhesive resin contained in the adhesive solution is relatively low, and thus, the high-temperature adhesive strength and the high-temperature oil resistance deteriorate. Therefore, in the present invention, when the ratio of the inorganic substance to the organic substance in the organic/inorganic complex adhesive solution was 0.05 to 0.6, adhesive properties at a high temperature were excellent.

Table 1 shows the solution and adhesive properties depending on the amount of sodium hydroxide (NaOH) or phosphoric acid (H$_3$PO$_4$) dissolved.

TABLE 1

| | Organic/inorganic complex adhesive solution | Type of inorganic substance | Dissolved amount (parts by weight) | Solution and adhesive properties | | | |
|---|---|---|---|---|---|---|---|
| | | | | Solution stability | Room temperature adhesive strength (25° C.) | High-temperature adhesive strength (150° C.) | High-temperature oil resistance |
| Inventive Example | Epoxy (molecular weight ≈ 30,000)-SiO$_2$ (25 nm, 20 parts by weight) complex | NaOH | 1 | ◎ | ◎ | ○ | ○ |
| | | | 5 | ◎ | ◎ | ○ | ○ |
| | | | 10 | ○ | ○ | ◎ | ◎ |
| | | | 15 | Δ | Δ | Δ | Δ |
| | | H$_3$PO$_4$ | 1 | ◎ | ◎ | ○ | ○ |
| | | | 30 | ◎ | ○ | ○ | ○ |
| | | | 50 | ○ | ○ | ○ | ○ |
| | | | 70 | Δ | Δ | Δ | Δ |
| | Epoxy (molecular weight ≈ 30,000)-TiO$_2$ (20 nm, 15 parts by weight) complex | NaOH | 1 | ◎ | ◎ | ○ | ○ |
| | | | 5 | ◎ | ◎ | ○ | ○ |
| | | | 10 | ○ | ◎ | ◎ | ◎ |
| | | | 15 | Δ | Δ | Δ | Δ |
| | | H$_3$PO$_4$ | 1 | ◎ | ◎ | ○ | ○ |
| | | | 30 | ◎ | ○ | ○ | ○ |
| | | | 50 | ○ | ○ | ○ | ○ |
| | | | 70 | Δ | Δ | Δ | Δ |
| | Epoxy (molecular weight ≈ 50,000)-ZnO (10 nm, 30 parts by weight) complex | NaOH | 1 | ○ | ◎ | Δ | Δ |
| | | | 5 | ○ | ◎ | ◎ | ◎ |
| | | | 10 | ○ | ○ | ○ | ○ |
| | | | 15 | Δ | Δ | Δ | Δ |
| | | H$_3$PO$_4$ | 1 | ○ | ◎ | Δ | Δ |
| | | | 30 | ○ | ○ | ◎ | ◎ |
| | | | 50 | ○ | ○ | ○ | ○ |
| | | | 70 | Δ | Δ | Δ | Δ |

Physical property determination is expressed by the symbols shown in Table 1 as follows: significantly excellent: ◎, excellent: ○, normal: Δ, and deteriorative: X.

In addition to the experiment shown in Table 1, cooling with a specific cooling condition after heat fusion was performed to further improve the fastening force of the adhesive composition.

FIG. 1 illustrates a flow chart of a method for manufacturing an electrical steel sheet product according to an exemplary embodiment of the present invention. FIG. 1 illustrates a flow chart of the heat fusion and cooling conditions (the holding pressing force and the cooling rate) for improving the adhesive strength of the electrical steel sheet, in particular, a peeling adhesive strength (T-Peel off) at room temperature.

The organic/inorganic complex (epoxy-$SiO_2$-based+ $H_3PO_4$) was prepared, and then, the organic/inorganic complex was coated and heat-fused onto a non-oriented electrical steel sheet strip. The results of measuring the adhesive strength depending on the cooling conditions (the holding pressing force and the cooling rate) are shown in Table 2. A molecular weight of the used epoxy adhesive resin was about 30,000, an average particle size of $SiO_2$ substituted for the epoxy adhesive resin was 15 nm, and the amount of particles was 20 parts by weight with respect to 100 parts by weight of the epoxy resin. In order to improve the high-temperature adhesive strength, a bonding solution was prepared by dissolving 5 parts by weight of phosphoric acid ($H_3PO_4$) with respect to 100 parts by weight of a solid content of the organic/inorganic complex. The organic/inorganic complex adhesive solution in which the nanoparticles and the inorganic substance were substituted and dissolved as described above was applied at a thickness of 5.0 μm per one surface while being cured at 400° C. for 20 seconds, the coated samples were cut into a predetermined size and laminated, the laminated samples were heat-fused at a pressing force of 500 N/mm² and a pressing temperature of 200° C. for a pressing time of 60 minutes, a holding pressing force was held at each of 0, 500 N/mm², 1,000 N/mm², and 1,500 N/mm², cooling was performed to room temperature at a cooling rate of each of 0.5° C./min to 10° C./min and 30° C./min, and then, an adhesive strength was measured. It could be appreciated from Table 2 that there was a large difference in adhesive strength (a shearing method and a peeling-off method) depending on the cooling conditions (the holding pressing force and the cooling rate), and the lower the holding pressing force and the slower the cooling rate, the better the adhesive strength measured by each of the shearing method and the peeling-off method. In particular, the adhesive strength measured by each of the shearing method and the peeling-off method at a holding pressing force of 500 N/mm² or less and a cooling rate of 1° C./min or less was excellent.

Table 2 shows the adhesive properties for each cooling condition.

TABLE 2

| | Bonding solution component and initial heat-fusing condition | | Cooling condition | | Adhesive properties Room temperature adhesive strength | |
|---|---|---|---|---|---|---|
| | | | Holding pressing force (N/mm²) | Cooling rate (° C./min) | Shearing method | Peeling-off method |
| Inventive Example | Epoxy-$SiO_2$ complex (molecular weight: about 30,000, $SiO_2$ (15 nm 20 parts by weight)) + $H_3PO_4$ (5 parts by weight) | Pressure 500 N/mm², time 60 minutes, temperature 200° C. | 0 | 0.5 | ◉ | ◉ |
| | | | | 1 | ◉ | ○ |
| | | | | 5 | ○ | Δ |
| | | | | 10 | X | X |
| | | | 500 | 0.5 | ◉ | ○ |
| | | | | 1 | ○ | ○ |
| | | | | 5 | ○ | Δ |
| | | | | 10 | Δ | X |
| | | | | 30 | X | X |
| | | | 1000 | 0.5 | ○ | ○ |
| | | | | 1 | ○ | Δ |
| | | | | 5 | Δ | Δ |
| | | | | 10 | Δ | X |
| | | | 1500 | 5 | X | X |

Physical property determination is expressed by the symbols shown in Table 2 as follows: significantly excellent: ◉, excellent: ○, normal: Δ, and deteriorative: X.

Figure 2:
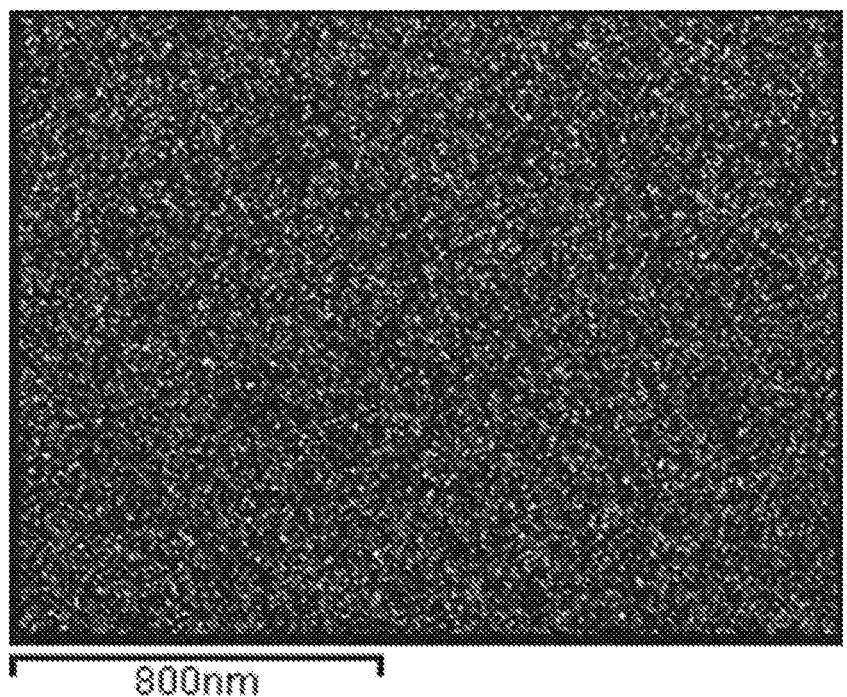
FIG. 2 is a photograph captured with a transmission electron microscope (TEM) after a cross section of a coating layer of an electrical steel sheet is processed with focus ion beam (FIB), the coating layer being formed of a composition in which sodium hydroxide (NaOH) as an inorganic substance is contained in an epoxy (molecular weight≈30,000)-$SiO_2$ (25 nm, 20 parts by weight) complex, and is a photograph showing a distribution of nanoparticles (one of $SiO_2$, $TiO_2$, and ZnO) in the adhesive coating layer.

FIG. 2 is a photograph captured with a transmission electron microscope (TEM) after a cross section of a coating layer of an electrical steel sheet is processed with focus ion beam (FIB), the coating layer being formed of a composition in which sodium hydroxide (NaOH) as an inorganic substance is contained in an epoxy (molecular weight≈30,000)-$SiO_2$ (25 nm, 20 parts by weight) complex, and is a photograph showing a distribution of nanoparticles (one of $SiO_2$, $TiO_2$, and ZnO) in the adhesive coating layer. In this case, white spots indicate the nanoparticles. It could be appreciated from FIG. 2 that the nanoparticles (one of $SiO_2$, $TiO_2$, and ZnO) were uniformly distributed in the coating layer, and the nanoparticles were uniformly distributed throughout the coating layer without a cohesion or aggregation phenomenon in the coating layer.

Figure 3:
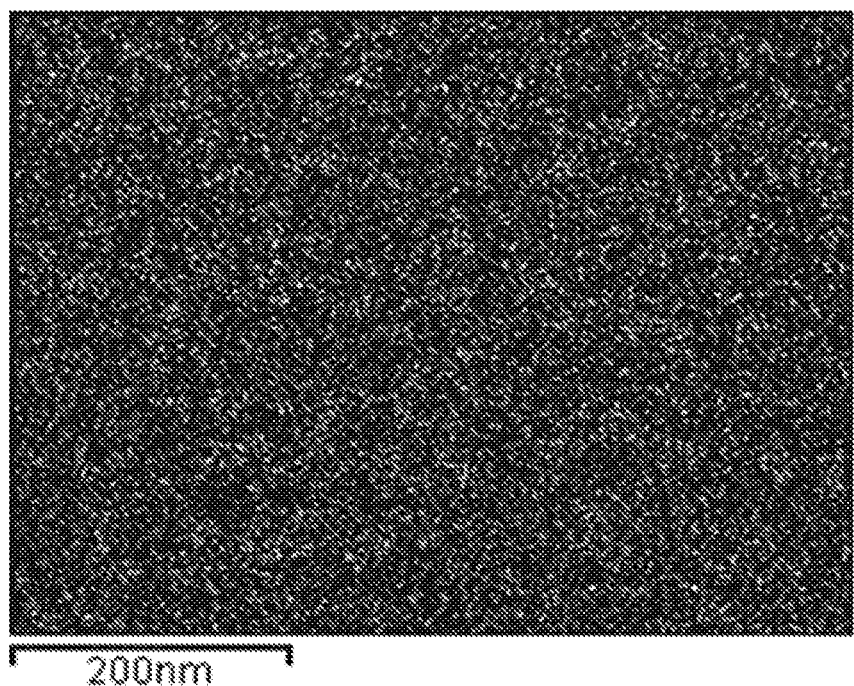
FIG. 3 is a photograph captured with a transmission electron microscope (TEM) after a cross section of a coating layer of an electrical steel sheet is processed with focus ion beam (FIB), the coating layer being formed of a composition in which sodium hydroxide (NaOH) as an inorganic substance is contained in an epoxy (molecular weight≈30,000)-$SiO_2$ (25 nm, 20 parts by weight) complex, and is a photograph showing a distribution of an inorganic substance (one of NaOH and $H_3PO_4$) dissolved in the adhesive coating layer.

In addition, FIG. 3 is a photograph captured with a transmission electron microscope (TEM) after a cross section of a coating layer of an electrical steel sheet is processed with focus ion beam (FIB), the coating layer being formed of a composition in which sodium hydroxide (NaOH) as an inorganic substance is contained in an epoxy (molecular weight≈30,000)-$SiO_2$ (25 nm, 20 parts by weight) complex, and is a photograph showing a distribution of an inorganic substance (one of NaOH and $H_3PO_4$) dissolved in the adhesive coating layer. In this case, white spots indicate the inorganic substance. It could be appreciated that the components (Na and P) contained in the inorganic substance were also uniformly distributed in the adhesive coating layer. The heat resistance of the adhesive resin was significantly improved by the uniform distribution of the nanoparticles and the inorganic substance described above, and thus, the high-temperature adhesive strength of the adhesive solution was improved to a level higher than that required in a drive motor for an environmentally friendly vehicle (hybrid electric vehicle (HEV) or electric vehicle (EV)).

In the present invention, as for the solution stability, an organic/inorganic complex in which nanoparticles were substituted or an organic/inorganic complex adhesive solution in which an inorganic substance was dissolved was strongly agitated with an agitator for 30 minutes, and the mixed solution was maintained for 30 minutes. Thereafter, the solution stability was determined by the presence or absence of precipitation or gelation in the coating composition.

As for the room temperature and high-temperature adhesive strength, samples to which the adhesive solution was applied at a predetermined thickness per one surface were laminated, the laminated samples were heat-fused, and then, a tensile adhesive strength at each of room temperature and a high temperature (150° C.) was measured. The adhesive strength measured at room temperature was expressed as "significantly excellent" when it was 6.0 MPa or more, was expressed as "excellent" when it was 3.0 MPa or more, was expressed as "normal" when it was 1.0 MPa or more, and was expressed as "deteriorative" when it was 0.5 MPa or less. On the other hand, the adhesive strength measured at a high temperature was expressed as "significantly excellent" when it was 3.0 MPa or more, was expressed as "excellent" when it was 1.0 MPa or more, was expressed as "normal" when it was 0.5 MPa or more, and was expressed as "deteriorative" when it was 0.5 MPa or less.

As for the high-temperature oil resistance, a heat-fused sample was maintained in automatic transmission fluid (ATF) oil at a high temperature (170° C.) for 3 hours or longer, the sample was slowly cooled, and a surface state and a tensile adhesive strength thereof at room temperature were measured. When observing the surface state, oil should not permeate into the interfaces of the single cores or the adhesive coating layer should not be melted by the ATF oil. As for determination criteria of the oil resistance in the present invention, the adhesive strength of the sample subjected to the ATF test at a high temperature was expressed as "significantly excellent" when it was 3.0 MPa or more, was expressed as "excellent" when it was 1.0 MPa or more, was expressed as "normal" when it was 0.5 MPa or more, and was expressed as "deteriorative" when it was 0.5 MPa or less.

As for the peeling adhesive strength, each of two coated samples was cut into a predetermined size (200 mm×30 mm), the prepared two samples were adhered to each other by 150 mm in a length direction, a non-adhesive portion corresponding to 50 mm was spread by 180° from both sides to form a T shape, the samples were fixed to upper/lower jigs with a predetermined force, and then, a tensile adhesive strength of the laminated sample was measured while pulling the sample at a predetermined speed. In this case, an average of values measured at points except for initial points corresponding to 10% and final points corresponding to 10% of total points with a predetermined force during peeling-off was measured as the tensile adhesive strength. The peeling-off adhesive strength measured at room temperature was expressed as "significantly excellent" when it was 50 N or more, was expressed as "excellent" when it was 30 N or more, was expressed as "normal" when it was 10 N or more, and was expressed as "deteriorative" when it was 10 N or less.

The present invention is not limited to the exemplary embodiments, but may be manufactured in various different forms, and it will be apparent to those skilled in the art to which the present invention pertains that various modifications and alterations may be made without departing from the spirit or essential feature of the present invention. Therefore, it is to be understood that the exemplary embodiments described hereinabove are illustrative rather than being restrictive in all aspects.

The invention claimed is:

1. A method for manufacturing an electrical steel sheet product, the method comprising:
preparing an adhesive coating composition;
forming an adhesive coating layer by applying and then curing the adhesive coating composition onto a surface of an electrical steel sheet;
forming a heat-fused layer by laminating and heat-fusing a plurality of electrical steel sheets on which the adhesive coating layers are formed; and
cooling the heat-fused electrical steel sheets at a cooling rate of 0.05 to 20° C./min,
wherein:
in the cooling of the heat-fused electrical steel sheets at the cooling rate of 0.05 to 20° C./min,
a holding pressing force is 1,000 N/mm$^2$ or less,
the adhesive coating composition contains an organic/inorganic complex and an inorganic substance,
the organic/inorganic complex comprises an organic resin and an inorganic nanoparticle,
the inorganic nanoparticle is at least partially substituted for a functional group of the organic resin,
the organic resin is a water-soluble epoxy resin,
the water-soluble epoxy resin is a multifunctional epoxy resin having three or more epoxy groups, and the water-soluble epoxy resin has a weight average molecular weight of 1,000 to 50,000, a softening temperature (Tg) of 70 to 120° C., and a solid fraction of 10 to 50 wt %,
the inorganic nanoparticle includes one or more of $SiO_2$, $TiO_2$, ZnO, $Al_2O_3$, MgO, CaO, and $ZrO_2$, and
the inorganic substance is phosphoric acid ($H_3PO_4$) or sodium hydroxide (NaOH).

2. The method of claim 1, wherein:
the holding pressing force is 500 N/mm$^2$ or less and the cooling rate is 0.05 to 1° C./min.

3. The method of claim 1, wherein:
in the cooling of the heat-fused electrical steel sheets at the cooling rate of 0.05 to 20° C./min,
a cooling finish temperature is 10 to 100° C.

4. The method of claim 1, wherein:
the inorganic nanoparticle is substituted in the organic/inorganic complex in an amount of 1 to 60 parts by weight with respect to 100 parts by weight of the organic resin.

5. The method of claim 1, wherein:
the inorganic substance is contained in an amount of 1 to 70 parts by weight with respect to 100 parts by weight of a solid content of the organic/inorganic complex.

6. The method of claim 1, wherein:
the forming of the adhesive coating layer
is performed in a temperature range of 200 to 600° C.

7. The method of claim 1, wherein:
in the forming of the adhesive coating layer,
a ratio of the inorganic substance to an organic substance in the adhesive coating layer is 0.05 to 0.6.

8. The method of claim 1, wherein:
in the forming of the heat-fused layer,
a pressing force is 1 to 2,000 N/mm$^2$, a pressing time is 1 to 180 minutes, and a pressing temperature is 100 to 300° C.

9. The method of claim 1, wherein:
the inorganic nanoparticle includes one or more of $Al_2O_3$, MgO, CaO, and $ZrO_2$.

* * * * *